US010249127B2

(12) United States Patent
Herron

(10) Patent No.: US 10,249,127 B2
(45) Date of Patent: Apr. 2, 2019

(54) PAY-PER-USE RECEPTACLE

(71) Applicant: Gumpsters, LLLP, Martin, GA (US)

(72) Inventor: Kim Harold Herron, Martin, GA (US)

(73) Assignee: GUMPSTERS, LLLP, Martin, GA (US)

( * ) Notice: Subject to any disclaimer, the term of this patent is extended or adjusted under 35 U.S.C. 154(b) by 6 days.

(21) Appl. No.: 15/686,792

(22) Filed: Aug. 25, 2017

(65) Prior Publication Data

US 2018/0061171 A1 Mar. 1, 2018

Related U.S. Application Data

(60) Provisional application No. 62/380,752, filed on Aug. 29, 2016.

(51) Int. Cl.
| | |
|---|---|
| *G07F 9/10* | (2006.01) |
| *B65F 1/10* | (2006.01) |
| *B65G 29/00* | (2006.01) |
| *G07F 17/00* | (2006.01) |
| *B65F 1/02* | (2006.01) |
| *G07F 9/02* | (2006.01) |
| *B65F 1/14* | (2006.01) |

(52) U.S. Cl.
CPC ............ *G07F 17/0014* (2013.01); *B65F 1/02* (2013.01); *B65F 1/10* (2013.01); *B65F 1/1426* (2013.01); *B65G 29/00* (2013.01); *G07F 9/026* (2013.01); *G07F 9/10* (2013.01); *B65F 2210/108* (2013.01); *B65F 2210/139* (2013.01); *B65F 2210/168* (2013.01); *B65F 2210/184* (2013.01)

(58) Field of Classification Search
CPC .... G07F 17/0014; G07F 9/026; B65F 1/1426; B65F 2210/108; B65F 2210/139
USPC ........ 235/380, 381, 382; 232/43.1; 198/703, 198/704, 714; 221/91
See application file for complete search history.

(56) References Cited

U.S. PATENT DOCUMENTS

| | | | | |
|---|---|---|---|---|
| 4,940,887 A | * | 7/1990 | Sheng-Jung | ............... B07C 1/00 177/25.15 |
| 5,667,136 A | * | 9/1997 | Chen | ......................... B65F 1/10 220/23.4 |

(Continued)

OTHER PUBLICATIONS

US 2010/0102126 A1, Apr. 29, Benson (Year: 2010).*

*Primary Examiner* — Douglas A Hess
(74) *Attorney, Agent, or Firm* — Morris, Manning & Martin, LLP; John R. Harris

(57) ABSTRACT

A pay-per-use receptacle, suitable for use in an attended or unattended manner, especially at a trash or waste disposal facility. The receptacle is a generally box-like enclosure, having a payment terminal for receiving a payment and an access door on the front surface for receiving a bag of material (such as trash) after a payment is made. The bag of material is placed on a generally horizontal surface of a rotatable bin, positioned immediately inside the access door. Upon closing the access door, the rotatable bin rotates, thereby moving the deposited bag to a discharge position above a chute guide. The bag is urged from the rotatable bin by the motion of the bin and gravity, and falls downwardly and outwardly through an opening in the rear of the receptacle, into an external bin, dumpster, or compactor. Also disclosed is an ornamental design for a pay-per-use receptacle, and a process for controlling the operations thereof.

11 Claims, 20 Drawing Sheets

(56) References Cited

U.S. PATENT DOCUMENTS

| | | | | |
|---|---|---|---|---|
| 6,010,239 A * | 1/2000 | Hardgrave | ............... | G07F 7/00 |
| | | | | 700/213 |
| 6,206,585 B1 * | 3/2001 | Walter | ............... | G03D 17/00 |
| | | | | 396/564 |
| 6,279,684 B1 * | 8/2001 | Lewis | ............... | G07F 11/045 |
| | | | | 186/36 |
| 6,578,762 B1 | 6/2003 | Knappmiller | | |
| 7,080,777 B2 * | 7/2006 | Wagner | ............... | B07C 7/005 |
| | | | | 209/703 |
| 7,886,973 B2 * | 2/2011 | Wagner | ............... | B07C 7/005 |
| | | | | 235/381 |
| 8,195,328 B2 * | 6/2012 | Mallett | ............... | A61L 11/00 |
| | | | | 700/236 |
| 8,550,282 B1 * | 10/2013 | Libhart | ............... | B65F 1/1615 |
| | | | | 220/234 |
| 8,560,460 B2 * | 10/2013 | Mallett | ............... | B07C 7/005 |
| | | | | 705/308 |
| 8,606,633 B2 * | 12/2013 | Tarbert | ............... | G06Q 10/087 |
| | | | | 235/375 |
| 8,827,152 B2 * | 9/2014 | Ross | ............... | G06K 7/0008 |
| | | | | 235/379 |
| 9,123,195 B2 * | 9/2015 | Meyer | ............... | G07F 17/0092 |
| 10,046,534 B2 * | 8/2018 | Faucher | ............... | B30B 9/3007 |

\* cited by examiner

PAY-PER-USE RECEPTACLE

CROSS REFERENCE TO RELATED APPLICATION

This application claims benefit under 35 U.S.C. § 119(e) to U.S. Provisional Patent Application No. 62/380,752, filed Aug. 29, 2016, and entitled "PAY-PER-USE RECEPTACLE", which is incorporated herein by reference as if set forth herein in its entirety.

BACKGROUND

Some communities provide waste disposal and recycling facilities for their citizens. In rural communities, such facilities are often in remote areas, separated from housing or other buildings. These facilities are often gated and attended during normal business hours, e.g. from 9 AM to 5 PM, but close after business hours. During business hours, citizens bring their waste and recycling items, typically disposing of the household waste in trash bags placed into a dumpster or compactor, and placing certain types of recyclable items in recycling containers. Attendants at the facilities ensure that citizens obey the rules about providing household waste in bags, and placing recyclable items in an appropriate container.

There are known problems with unauthorized after-hours disposal of waste in some communities. Some people insist up leaving their trash outside the gate of the disposal facility, leading to scattering of trash, odors, attracting scavengers, and a general mess for attendants to clean up the next day. Merely posting signs warning of penalties for dropping off trash after hours is not always effective.

In addition, some waste disposal and recycling facilities charge fees on a per-bag basis, as a way to cover the cost of eventual disposal in a landfill. Accepting fees on a per-bag or other discrete basis requires that an attendant accept cash from citizens when the trash bags are dropped off, or use a credit or debit card terminal to accept other forms of payment. Accepting cash at a waste disposal facility creates a separate set of problems for the facility, such as employee training and monitoring, and security for the collection of cash.

There is therefore a need for a waste disposal facility that allows after-hours dropoff of trash and other items, on an unattended basis, but provides sufficient incentives to citizens to obey the laws and guidelines and place their trash in a place where it is less likely to scatter, create odor problems, or attract scavengers. There is also a need for an improved for-pay trash receptacle suitable for a pay-per-use operation at a waste disposal facility, whether or not attended.

Furthermore, there is a need to encourage citizens to recycle. By promoting a "pay per throw" disposal mentality for landfill-directed waste, municipalities can encourage recycling of certain types of materials (glass, plastic, metal, paper) and thereby reduce the volume of waste that eventually winds up in a landfill. A "pay per throw" approach to waste disposal tends to encourage consumers to reduce their individual expenditures on waste disposal by encouraging recycling to lower volume usage of waste disposal facilities, since each bag of trash has a known cost.

One approach to the after-hours/unattended trash dropoff problem is described in U.S. Pat. No. 6,578,762, to Leonard Knappmiller, "Payment Accepting Trash Receptacle". This patent describes a payment accepting trash receptacle that includes a hollow body having an interior space and a first opening, a receiving assembly pivotably mounted in the first opening, a payment acceptor attached to the hollow body, and an access restrictor cooperatively connected to the payment acceptor, for regulating access to the interior space. One problem with this approach is the limited interior space—it is basically just a limited access garbage can—and the fact that trash placed in the receiving assembly falls directly into the interior space.

There is a need for a pay-per-use receptacle that limits the amount of trash that is received for a payment, but is capable of directing the trash to separate holding container, such as a compactor or dumpster.

BRIEF SUMMARY

Briefly described, the present disclosure relates to a pay-per-use receptacle for use in receiving a payment for deposit of a bag of material, such as a bag of trash or other waste, and directing the bag of material into an external bin or other external container. According to one aspect, the disclosed receptacle includes a front surface for engaging a person for receiving a payment and a deposited bag of material, the front surface comprising a control panel with a payment-receiving terminal and an access door to the interior of the receptacle. An electronic controller operates the functions of the receptacle. An access door interlock is controlled by the controller for keeping the access door locked until a valid payment is received.

The receptacle includes an internally mounted rotatable bin mounted for rotation within the receptacle. The rotatable bin is divided into a plurality of segments (three in the disclosed embodiment), each segment defined by a circular plate on each end and a generally rectangular divider plate, confined within the receptacle.

The receptacle further includes a movable false ceiling positioned above the rotatable bin that pivots upwardly to facilitate passage of a deposited bag of material that has been pressed or forced into the bin due to size. The false ceiling is biased upwardly, e.g. by springs to facilitate the passage of an oversized bag but returns to a closed position by weight of the ceiling after the bag has been deposited.

The receptacle includes a rear surface including a rear discharge opening for directing a deposited bag of material externally of the receptacle, the discharge opening being of a size substantially the same as a segment on the rotatable bin. A motor is provided for rotating the rotatable bin a predetermined angular amount to move a bag of material deposited through the access door onto a divider plate to a position for discharge from the receptacle. The controller controls the operations of the rotatable bin.

The electronic controller controls locking and unlocking of the access door and the rotatable bin motor. The controller is operative to receive and validate a payment, release the access door interlock upon receipt of a valid payment, detect the closing of the access door after deposit of a bag of material, lock the access door via the access door interlock, and rotate the rotatable bin a predetermined angular amount so as to transfer a deposited bag of material to a position such that the deposited bag is urged downwardly and outwardly of the receptacle into an external bin or other external container positioned outside the rear surface of the receptacle.

According to an aspect, the access door opens into one of the segments of the rotatable bin. A first divider plate of the rotatable bin is initially positioned substantially horizontally beneath a lowermost extent of the access door, and a second divider plate of the rotatable bin is positioned above an uppermost extent of the access door, thereby defining a segment of the rotatable bin.

According to an aspect, the rotatable bin assumes an initial position such that one of the divider plates is in a generally horizontal position adjacent to the access door for receiving a bag of material when the access door is opened.

According to another aspect, the disclosed receptacle further comprises a weight sensor coupled to the axis of the rotatable bin, for detecting the weight of a bag of material deposited through the access door, prior to accepting the bag of material and locking the access door. Further to this aspect, the weight sensor and controller are configured to determine whether the weight of a deposited bag of material is less than predetermined acceptable weight, before accepting the deposited bag and locking the access door.

According to another aspect, the disclosed receptacle further includes a rotation position sensor coupled to the rotatable bin for detecting the instantaneous position of the rotatable bin.

According to yet another aspect, the disclosed receptacle includes a motion sensor for detecting the approach of a person or thing to the front surface of the receptacle, and operative for actuating features of the controller. Optionally, the receptacle may include a camera for video recording a person's interaction with the receptacle to discourage vandalism or unwanted deposit of trash outside the receptacle. Further still, the receptacle may include a light for illuminating the area surrounding the receptacle upon detection of darkness, to further discourage unwanted behavior or vandalism and improve the quality of images taken by the camera.

Details of the construction and operation of the disclosed embodiments are more fully hereinafter described and claimed. In the detailed description, reference is made to the accompanying drawings, forming a part of this disclosure, in which like numerals refer to like parts throughout the several views.

BRIEF DESCRIPTION OF THE DRAWINGS

The accompanying drawings illustrate one or more embodiments and/or aspects of the disclosure and, together with the written description, serve to explain the principles of the disclosure.

DETAILED DESCRIPTION

For the purpose of promoting an understanding of the principles of the present disclosure, reference will now be made to the embodiments illustrated in the figures and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Figure 1:
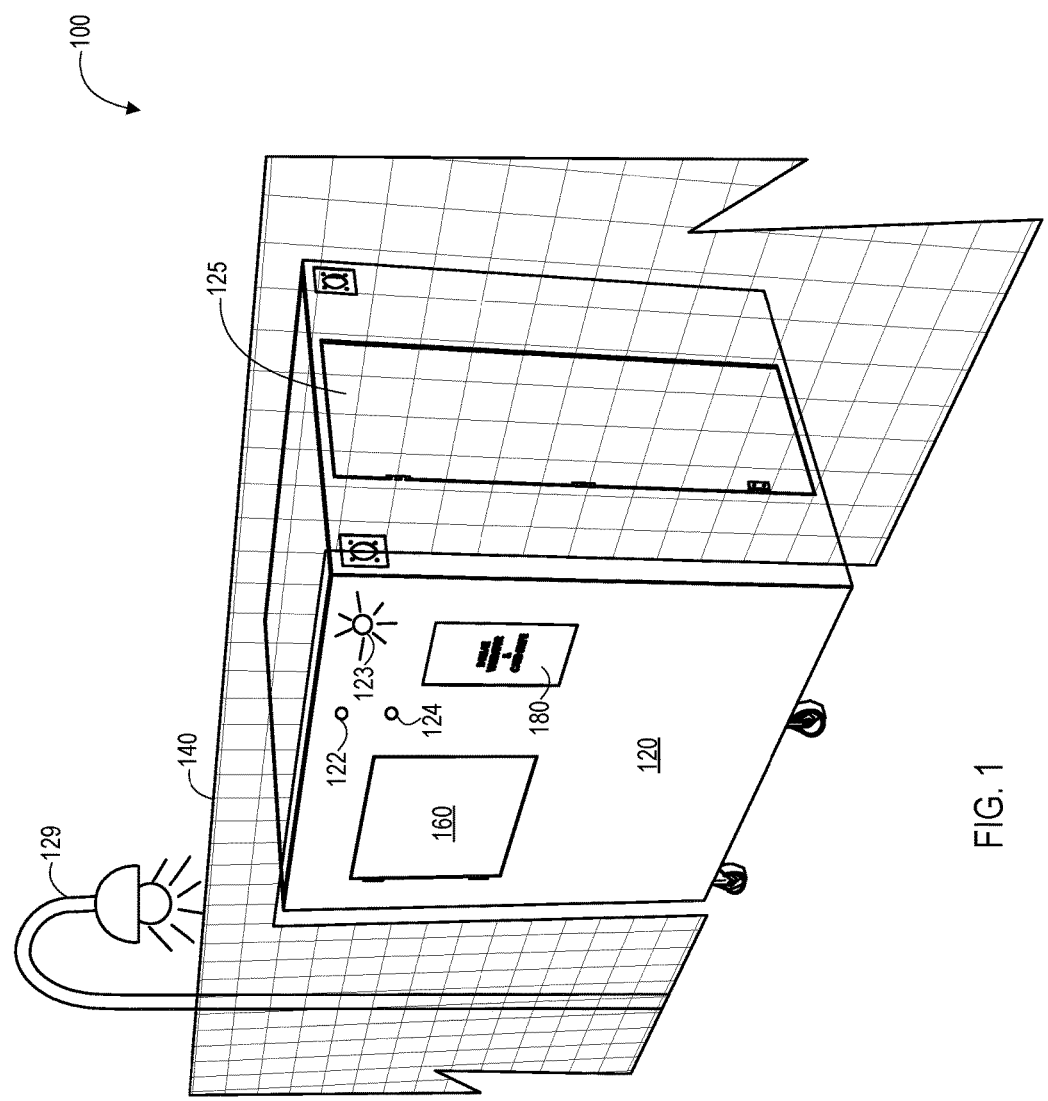
FIG. 1 is a perspective view of a pay-per-use receptacle according to an aspect of this disclosure, in position at a waste disposal facility.

FIG. 1 shows a pay-per-use receptacle 100, according to one aspect of the disclosure. The receptacle 100 is shown with an exposed front face 120, positioned so that the front face 120 is surrounded by a fence 140 of a waste disposal facility, but accessible to an individual for use. As shown, the front face 120 is exposed for access, but the body of the receptacle 100 is behind the fence 140 and surrounded to discourage an individual from leaving trash at the foot or base of the receptacle or from throwing trash over the fence. The receptacle 100 is shown here positioned behind a fence but accessible to a person outside the fence, for example, for unattended, after hours use. However, it will be understood and appreciated that the receptacle 100 could be operated on an attended basis (with an attendant nearby or on standby), or could be used inside a facility, whether or not attended and whether or not during or after business hours. Numerous applications exist, and no limitation is intended to require a fence, the presence or absence of an attendant, or physical location relative to an external bin, dumpster, or compactor.

The front face 120 of the receptacle 100 includes an access door 160 and a control panel 180 that allows for receipt of a payment. The control panel 180 provides a means for receiving a payment from an individual (cash, credit card, smartphone wallet, or other form of payment), and releasing the access door 160 for placement of a trash bag of a particular range of sizes. A controller (not shown) is coupled to the control panel 180 for operating the various features of the receptacle 100, as will be described.

According to one aspect, the receptacle 100 optionally includes a motion sensor 122, a light 123, and a video camera 124, coupled to the controller and operative as described in more detail below. The motion sensor 122 is employed to detect the approach of a vehicle or a person and trigger operation of the camera 124 and, if the environment is dimly lit or dark, turn on the light 123 to illuminate the area in front of the receptacle. The combination of motion sensor, camera, and light (preferably coupled with a written notice on a sign) provide notice to an approaching person that their presence has been detected and may be recorded. While such measures admittedly may not stop a determined transgressor, the presence of lighting and recording of persons in the vicinity helps keep an honest person honest and discourages the abandonment of trash or attempted defacement of the receptacle.

According to another and optional aspect, a combination motion detector, camera and/or light could be provided in an integrated assembly 129 mounted on a pole or other mounting structure, elevated and made inaccessible to a person on the ground. Such an alternative arrangement would still serve the purpose of discouraging unwanted behavior of leaving trash behind, and make it more difficult for a vandal to tamper with the motion detector, camera, and/or light.

Still referring to FIG. 1, the receptacle 100 also includes a security door 125 on a side thereof, for permitting access to the controller and other internal components of the receptacle for maintenance and service.

Figure 2:
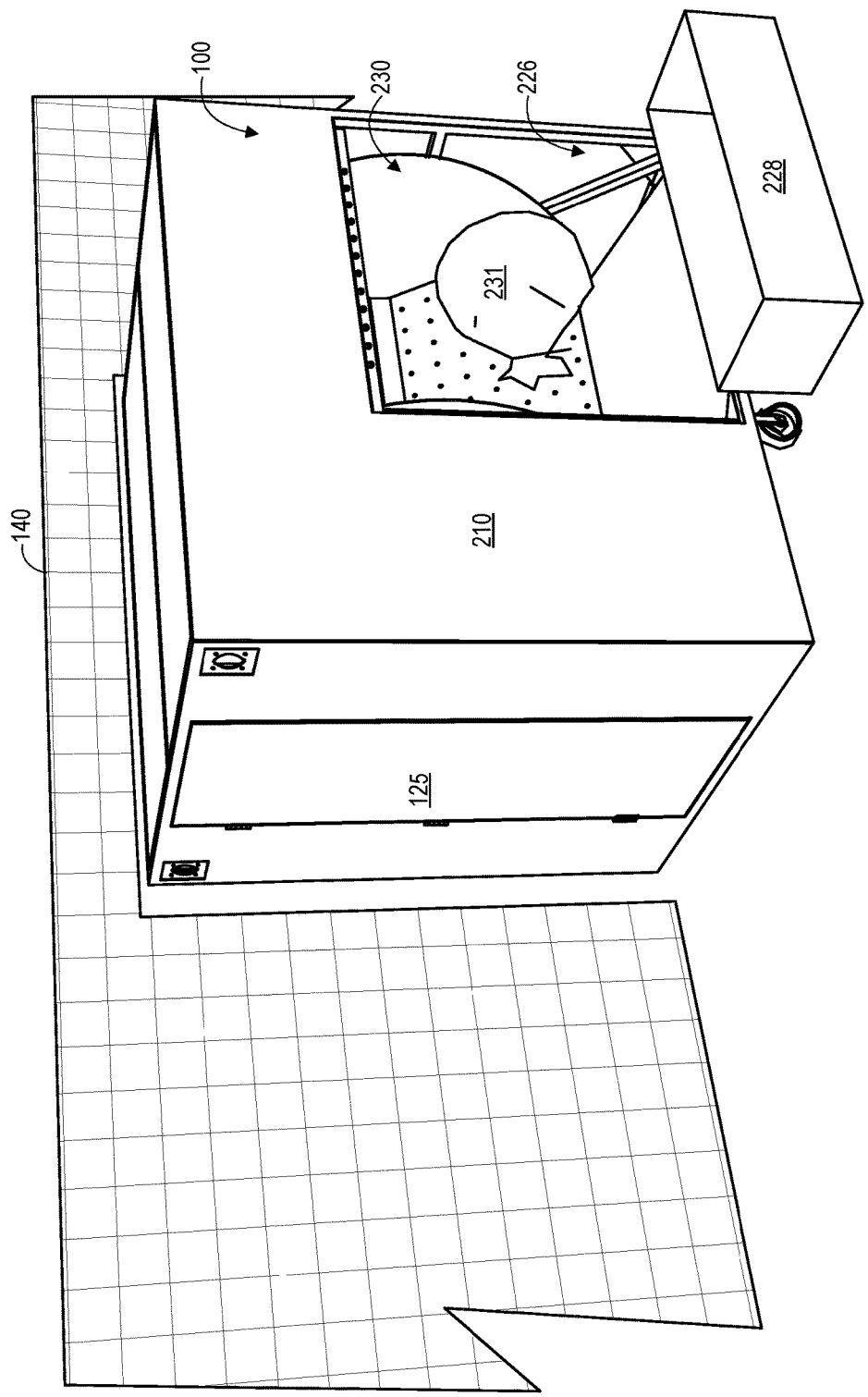
FIG. 2 is a rear perspective view of the receptacle of FIG. 1.

FIG. 2 shows an exemplary receptacle 100 from the rear, contained within and behind the fence 140 of the waste disposal facility. According to one aspect, the receptacle 100 includes a rear or discharge opening 226 positioned to a rear side or face 210 of the receptacle, for discharging a waste or trash bag 231 into a bin or container 228, which is independent of the receptacle. Also visible in FIG. 2 is a portion of a rotatable hopper or bin 230 that is contained within the receptacle for rotatable movement to discharge a trash bag 231 into the bin 228.

Figure 3:
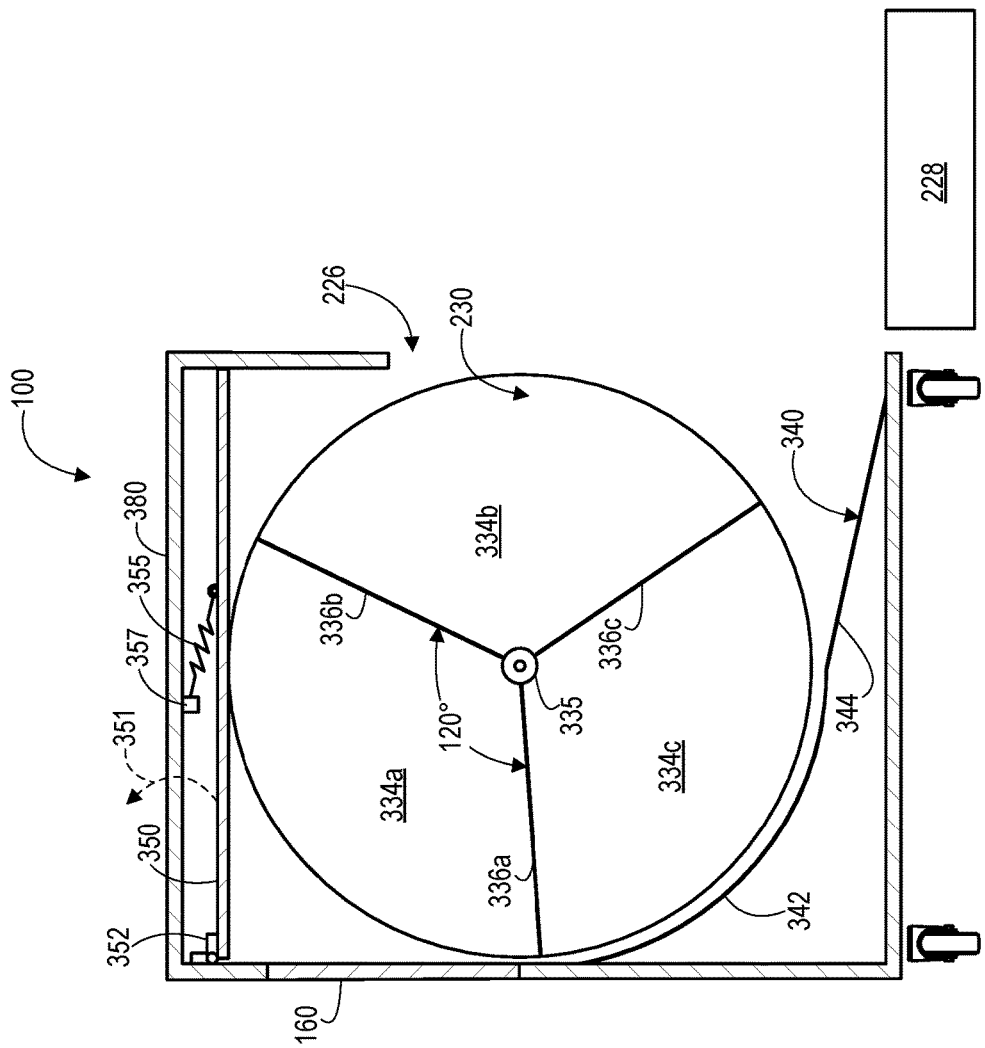
FIG. 3 is a cutaway side elevation view of the receptacle, showing an interior rotatable bin.

FIG. 3 shows a receptacle 100 constructed in accordance with this disclosure, elevation view of the right side, partially cut away to show the rotatable bin 230. The bin 230 rotates around an axis 335, powered by an electric or hydraulic motor (not shown), under control of the controller (not shown). The bin 230 is a preferably a cylinder of predetermined width, corresponding to that of a typical 60 cubic gallon trash bag that is packed to near capacity, e.g. bag 231 as in FIG. 2. The bin 230 is divided into three segments 334 of 120 degrees, 334a, 334b, 334c, each segment having a volume for accommodating a 60 cubic gallon bag. Each segment 334 is defined by a divider 336, preferably made of perforated metal, extending axially from the axis to the outer surface of the cylinder that defines the bin 230.

As shown in FIG. 3, three divider plates or dividers 336a, 336b, 336c divide the inside of the cylinder defining the rotary bin 230 into three segments. As shown, a first segment 334a is positioned in front of the access door 160 with a first divider 336a in a near horizontal position, to provide a surface for depositing a trash bag (not shown) when the access door is opened. In this configuration, the first segment 334a is in an initialized near-horizontal trash-receiving position, ready to receive a trash bag. In this initialized configuration, a second segment 334b is defined between a second divider 336b and a third divider 336c. The second segment 334b is shown with the third divider 336c at a steep angle so that a trash bag placed within the second segment (as in a prior operation of the receptacle) would tend to fall off the surface of the divider and into the bin 228. A third segment 334c, defined between the first divider 336a and third divider 336c, is positioned to move up to the trash receiving position upon operation of the receptacle.

According to one aspect, the divider plates 336 are made of flat metal sheets, with rows of perforations, so as to promote ventilation within the receptacle and permit any fluids to flow downwardly to the bottom of the receptacle.

The receptacle 100 further includes a top 380 that covers the top of the receptacle and prevents placement of a trash bag within the container in any way other than through the access door 160.

According to an aspect, the receptacle 100 includes a pivotable false ceiling 350 that is mounted immediately below but spaced apart from and generally parallel to the lower surface of the top 380. The false ceiling limits the volume of a segment 334 of the bin 230 to some degree, so that a deposited bag of material cannot readily be forced or "crammed" into the segment without some resistance.

The false ceiling 350 is mounted for pivotable movement in the direction of arrow 351 with hinges 352 that are affixed to the false ceiling and to the front of the receptacle 100. The false ceiling is preferable made of metal, such as a steel plate, and biased upwardly by a spring or springs 355 that are mounted at one end to the false ceiling at one end and the other end to a mounting bracket 357 that is affixed to the lower surface of the top 380. As will be shown, the false ceiling is movable to facilitate passage of a large, perhaps overstuffed bag of material that might be crammed into a segment 334 of the bin 230. The false ceiling is biased upwardly to provide some "give" for movement of the bag of material, and returns to a rest position after passage of the bag by the force of gravity from the weight of the false ceiling. Further details of the false ceiling 350 are provided below.

Still referring to FIG. 3, the receptacle 100 further includes a chute guide 340, positioned underneath the rotatable bin 230, for directing a trash bag placed on one of the divider plates 336 downwardly and outwardly from the rear opening 226. Preferably, the chute guide 340 is of metal, with a first segment 342 having an arcuate shape basically conforming to the cylindrical shape of the rotatable bin 230, and a second straight segment 344 extending from the lowermost extent of the rotatable bin 230, at a downwardly sloping angle to direct a trash bag into the external bin 228.

According to another aspect, the receptacle 100 may be positioned directly over a trash compactor or larger dumpster than that shown as the bin 228. In such a configuration the receptacle would be mounted at an accessible height for a person, and the trash compactor or dumpster would be positioned lower than the discharge opening 226 so that a trash bag is directly deposited into the compactor or dumpster.

Figure 4A:
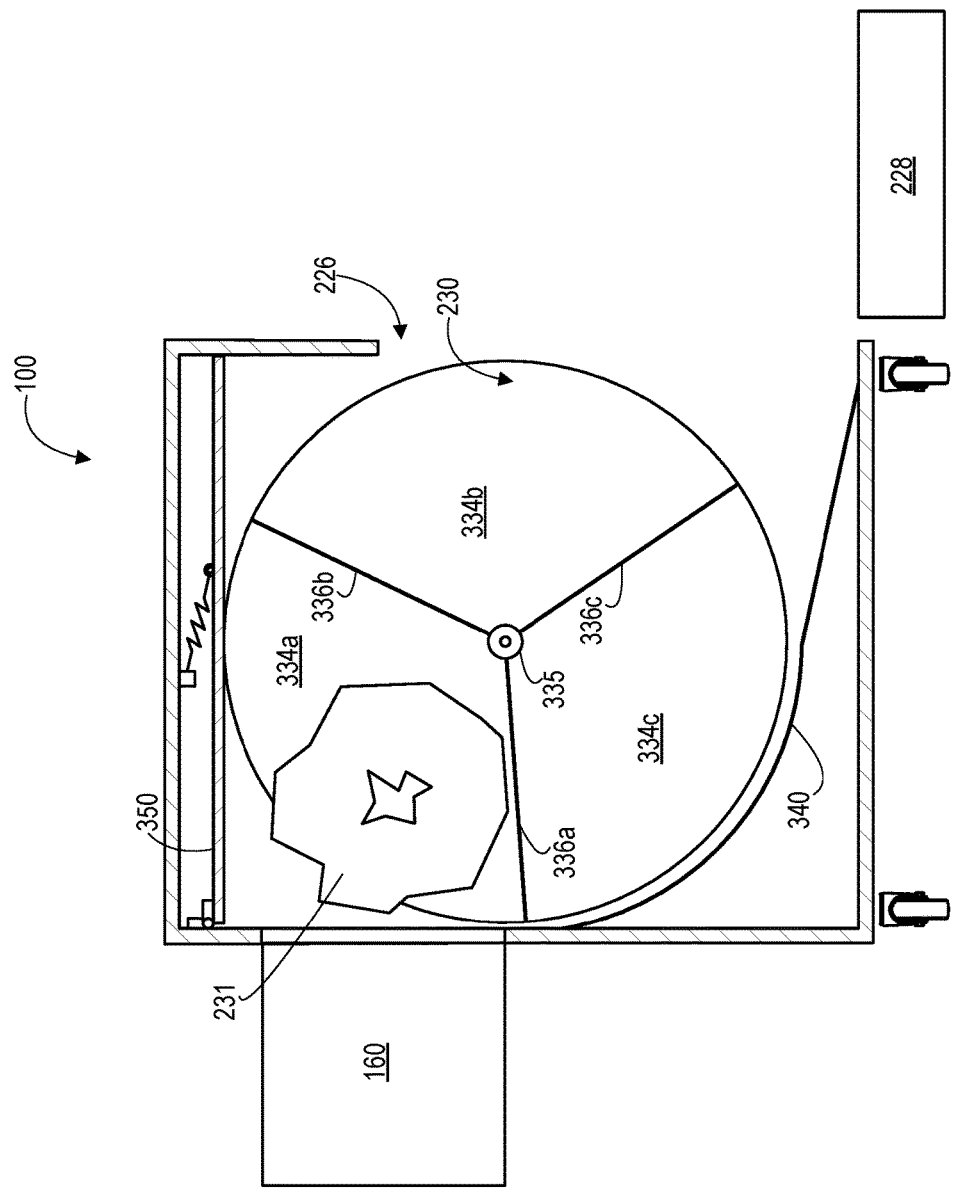
FIG. 4, consisting of FIG. 4A through 4D, illustrates the operation of the rotatable bin, according to an aspect of the disclosure.

FIG. 4, consisting of FIGS. 4A through 4D, illustrate the operation of the disclosed pay-per-use receptacle 100. FIG. 4A shows the receptacle 100 in a cross-sectional cutaway view, with the access door 160 open after accepting a payment. The controller is operative to release a lock (not shown) on the door 160 once a valid payment has been detected and accepted. With the door 160 released and openable, a person can place a trash bag 231 into the space defined by a first segment 334a, resting on the generally horizontal surface of the metal divider 336a. The other two segments 334b, 334c are empty, having previously deposited any prior placed trash bags in the bin 228 in a prior operation.

Figure 4B:
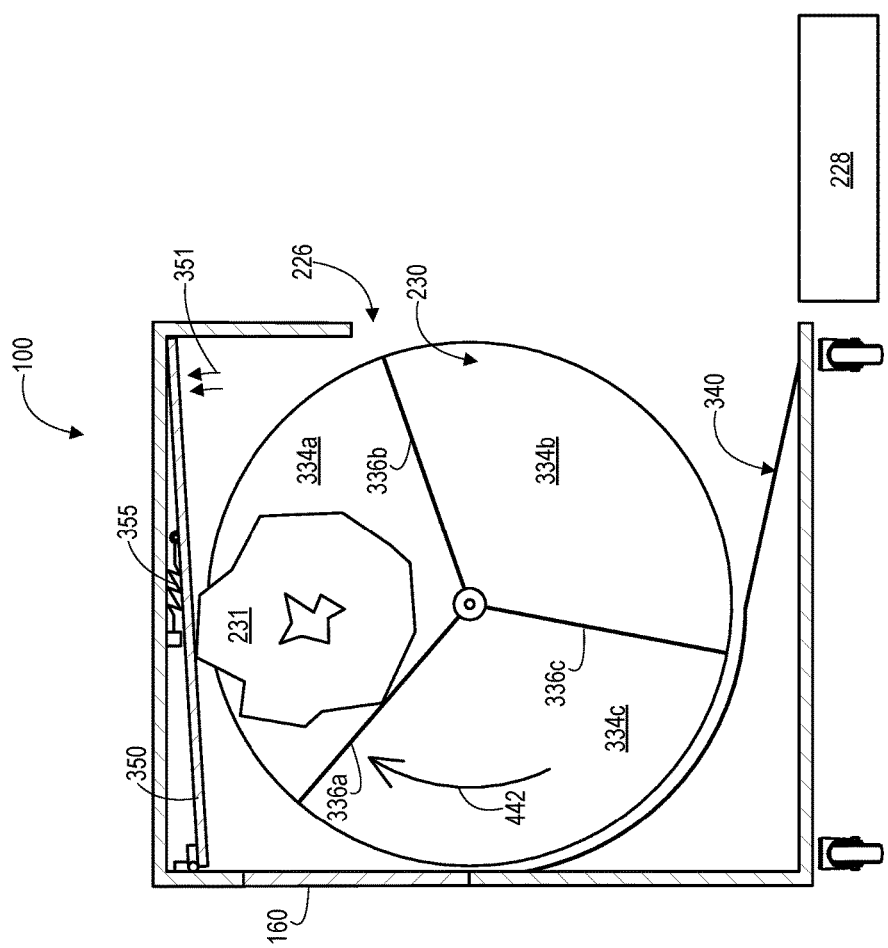

FIG. 4B shows the receptacle 100 after the controller has detected that the door 160 has been closed, payment received, and (optionally) a bag is detected as present within the first segment 334a. Once the required conditions for rotation are satisfied (e.g. payment, door closed, bag present, weight within acceptable bounds, etc. as may be determined by the programming of the controller), the controller then begins to rotate the rotatable bin 230 in the direction of arrow 442, moving the placed trash bag 231 in the segment 334a towards the rear discharge opening 226.

As shown in FIG. 4B, in the event that a bag of material 231 is large and perhaps stuffed into the segment 334 and contacting with the false ceiling 350, upon rotation of the bin 230, the false ceiling 350 may pivot upwardly, assisted by the bias of the springs 355, in the direction of arrow 351, to ease the passage of the overstuffed bag towards its ultimate discharge.

Figure 4C:
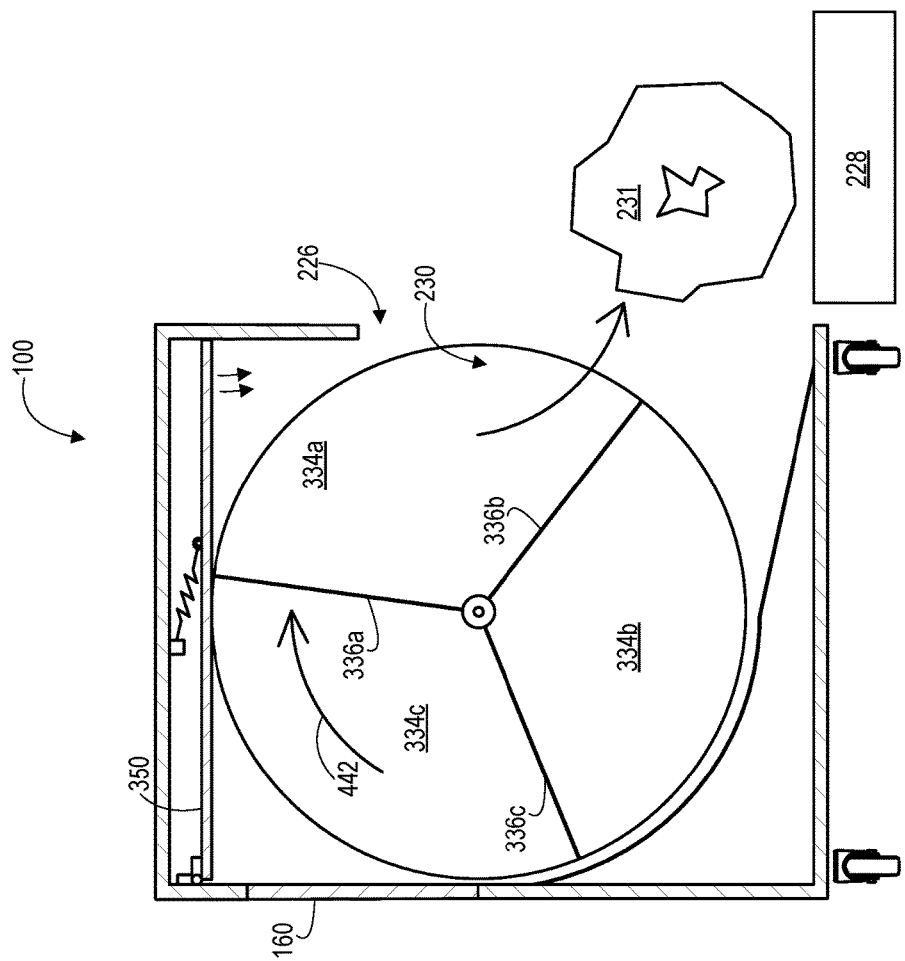

FIG. 4C shows the receptacle 100 after rotating the rotatable bin almost (but not quite) the full 120 degrees of rotation in the direction of arrow 442. At this position, the metal divider 336b, which together with divider 336a define the segment 334a, is moved to a downwardly angled position, permitting the trash bag 231 placed into the segment 334a to be urged downwardly by gravity and motion of the rotatable bin 230 through the discharge opening 226 into the external bin 228. In addition, the false ceiling 350 is returned to its rest position by the force of gravity, from the weight of the false ceiling.

Figure 4D:
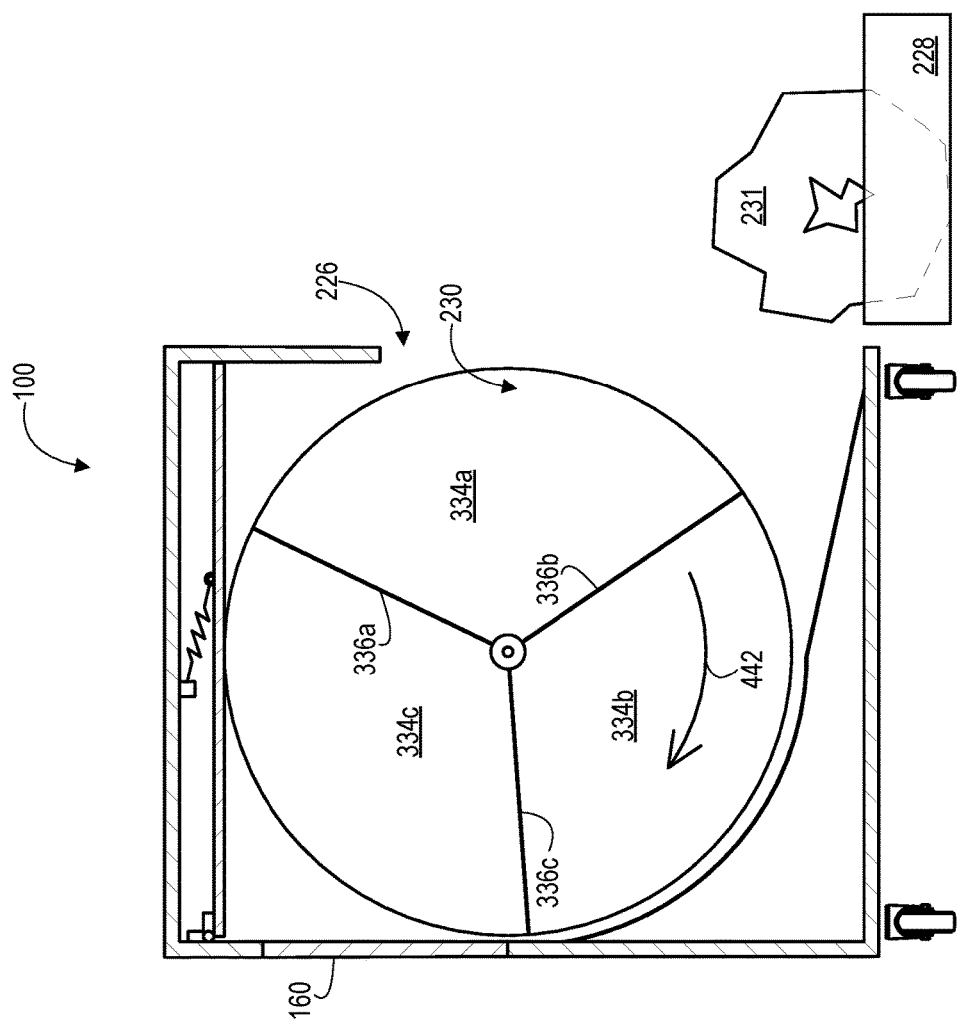

FIG. 4D shows the receptacle 100 after rotating the rotatable bin 230 the full 120 degrees of rotation in the direction of arrow 442. At this position, the metal divider 336b, which together with divider 336a define the segment 334a, is in a downwardly angled position, and the divider 336c is in position immediately beneath the lower edge of the door 160, for receiving another trash bag (not shown) upon acceptance of a subsequent payment. The presently-deposited trash bag 231 is shown outside the receptacle 100, within the external bin 228, or alternatively deposited into a compactor or dumpster, not shown, if the receptacle is positioned adjacent to and above a larger and lower-positioned compactor or dumpster. The receptacle 100 is now ready to receive a subsequent payment in a subsequent operation.

Figure 5:
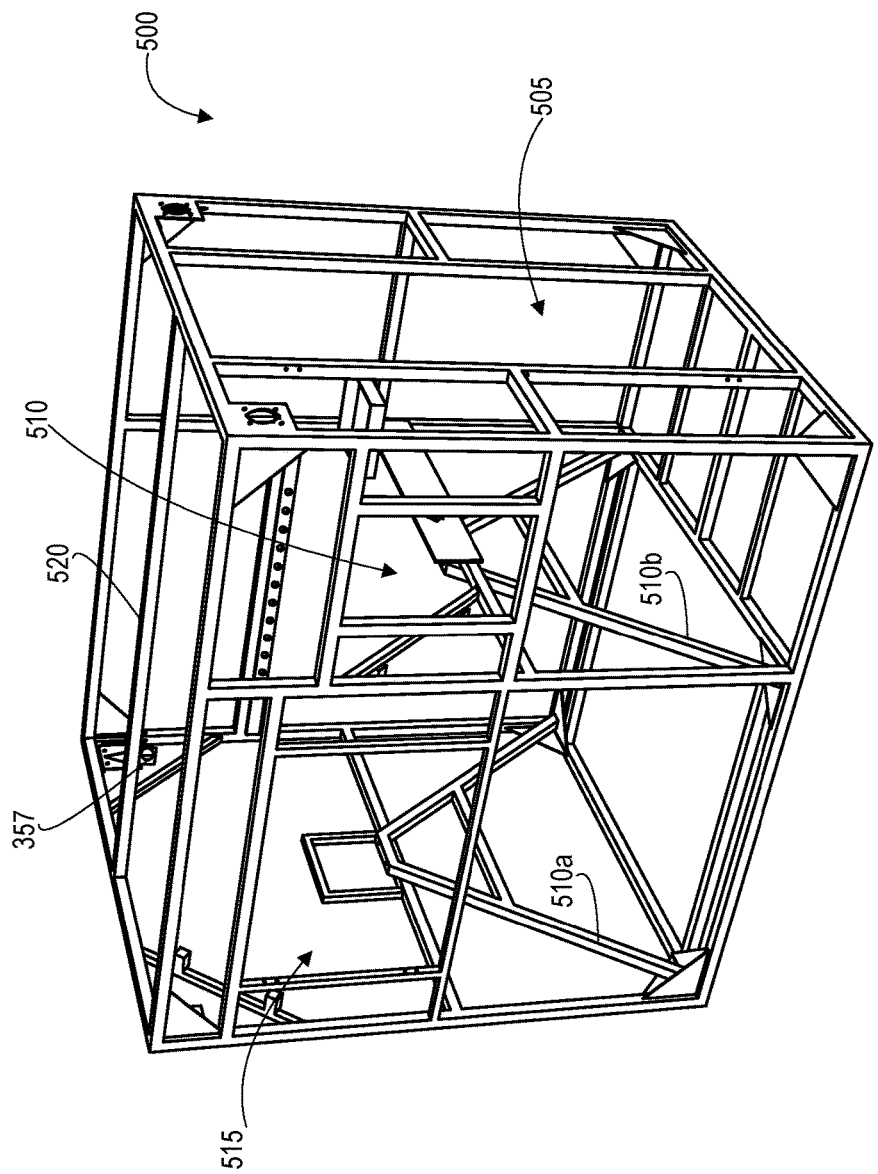
FIG. 5 shows a frame for the receptacle of FIG. 1, without front, side, top or rear panels.

FIG. 5 illustrates a frame 500 that mounts and houses the various components of a pay-per-use receptacle 100, constructed in accordance with the present disclosure. The frame 500 is preferably fabricated from welded metal tubing (steel or aluminum), forming a skeleton onto which is mounted metal plates forming the front side, left and right sides, rear side, and top. A right side of the frame 500 includes an opening 505 for mounting the security door 125, as seen in FIG. 1.

A pair of A-frame mounts or struts 510a, 510b are mounted within the frame 500 for supporting the axle 335 (not shown) of the rotatable bin 230. The A-frame struts 510 also support an electric or hydraulic motor (not shown) which is employed to rotate the bin 230. Other openings are defined in the frame 500 for receiving and supporting the elements of the access door 160 (not shown) and the control panel 180 (not shown), e.g. openings 515 and 518, respectively.

According to an aspect, a horizontally extending strut 520 is mounted centrally within the frame at the top of the frame, for supporting the top 380 (FIG. 3) of the receptacle 100. The strut 520 also preferably includes the mounting bracket 357 for the springs (FIG. 3) that bias the false ceiling.

Figure 6:
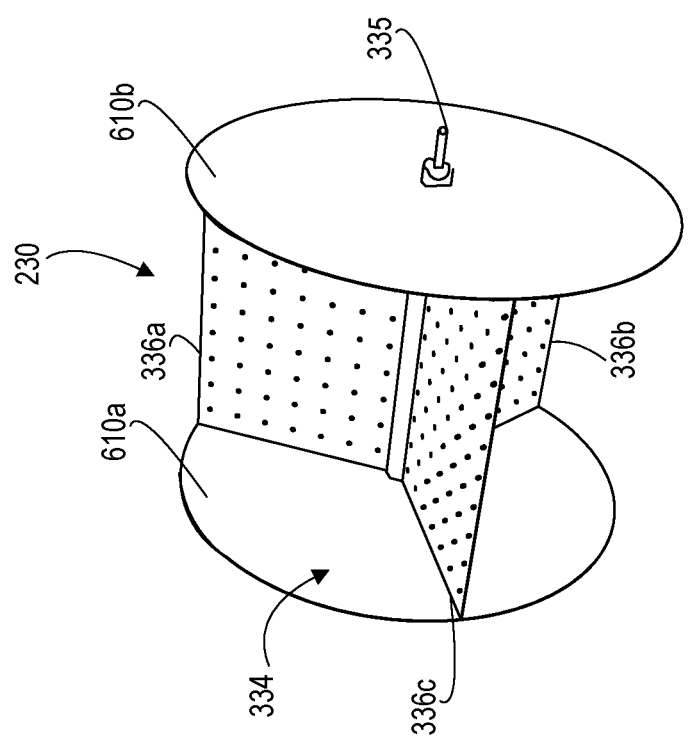
FIG. 6 is a perspective view of a rotatable bin of the receptacle of FIG. 1.

FIG. 6 shows details of the rotatable bin 230, according to an aspect of this disclosure. The rotatable bin 230 comprises an axle 335 which is the center of rotation, a pair of circular enclosing disks 610a, 610b, and three rectangular and axially extending dividers 336a, 336b, 336c, showing the rows of perforations that are preferred. The enclosing disks 610 and dividers 336 define the segments 334 of the rotatable bin 230.

Figure 7:
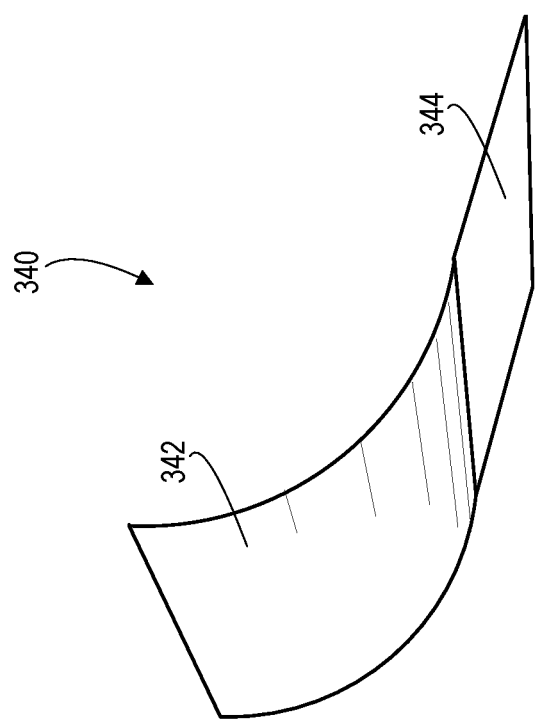
FIG. 7 is a perspective view of a chute guide of the receptacle of FIG. 1.

FIG. 7 illustrates details of the chute guide 340, according to an aspect of this disclosure. The chute guide 340 is preferably fabricated of a smooth surface material such as metal or heavy duty plastic, so as to minimize resistance to slidable motion of a trash bag deposited onto the chute guide and directed into a bin outside the receptacle 100. The chute guide 340 preferably includes a first curved or arcuate portion 342 that is fastened (e.g. by welding or other fastening method) to the interior of the frame 500, immediately beneath the opening of the access door 160. In this manner, any loose materials or liquids escaping from a trash bag will be directed downwardly and outwardly from the chute guide 340. Preferably, the diameter of the curved portion 342 is slightly greater than that of the diameter of the rotatable bin 230, so that the rotatable bin may rotate freely but not provide significant spacing so that any debris or loose portions of a trash bag will become snagged in the spacing between the chute guide and a metal divider 336 of the rotatable bin 230.

The straight or flat portion 344 of the chute guide 340 preferably extends from the lowermost extent of the rotatable bin, e.g. at the 180 degree point measure from the topmost extent of the rotatable bin, so as to provide a smooth sliding surface for a trash bag to move downwardly and outwardly of the receptacle 100.

Figure 8A:
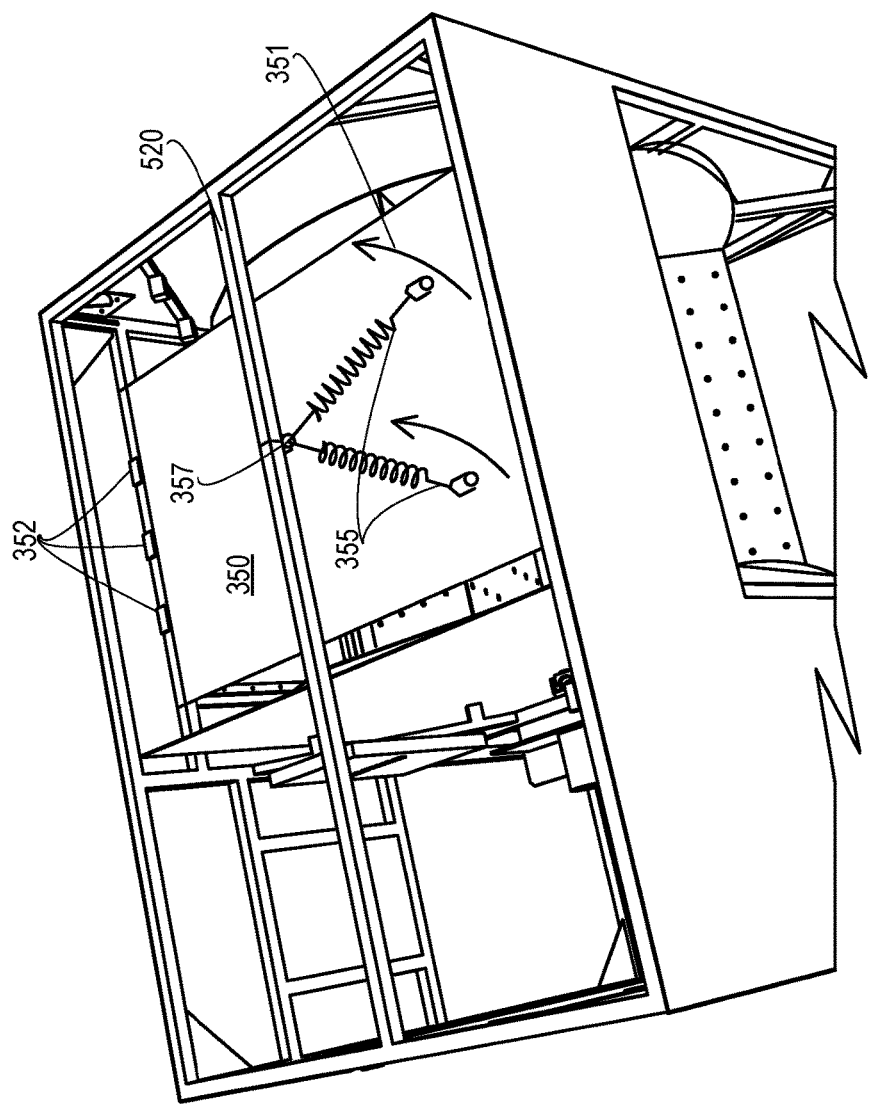
FIG. 8, consisting of FIGS. 8A and 8B, shows the pivotable false ceiling of the receptacle of FIG. 1.
Figure 8B:
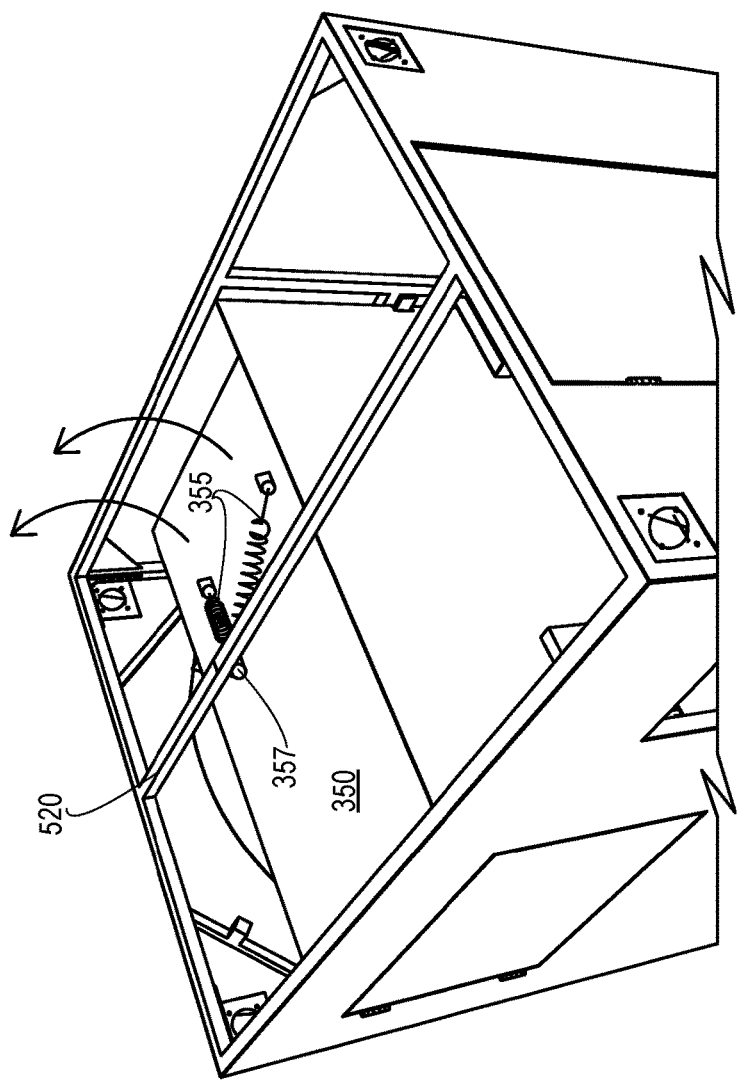

FIG. 8, consisting of FIGS. 8A and 8B, show details of the mounting of the false ceiling 350 within the frame 500. The false ceiling is mounted for pivotable movement at one or more hinges 352, positioned toward the front of the receptacle 100. The false ceiling pivots in the direction of arrow(s) 351. The false ceiling is biased upwardly to a predetermined degree by one or more springs 355. In the embodiment shown, there are two coil springs 355. One end of each spring 355 is affixed to the false ceiling, and the other end is affixed to rods or a cable that is threaded through a mounting bracket 357.

Figure 9:
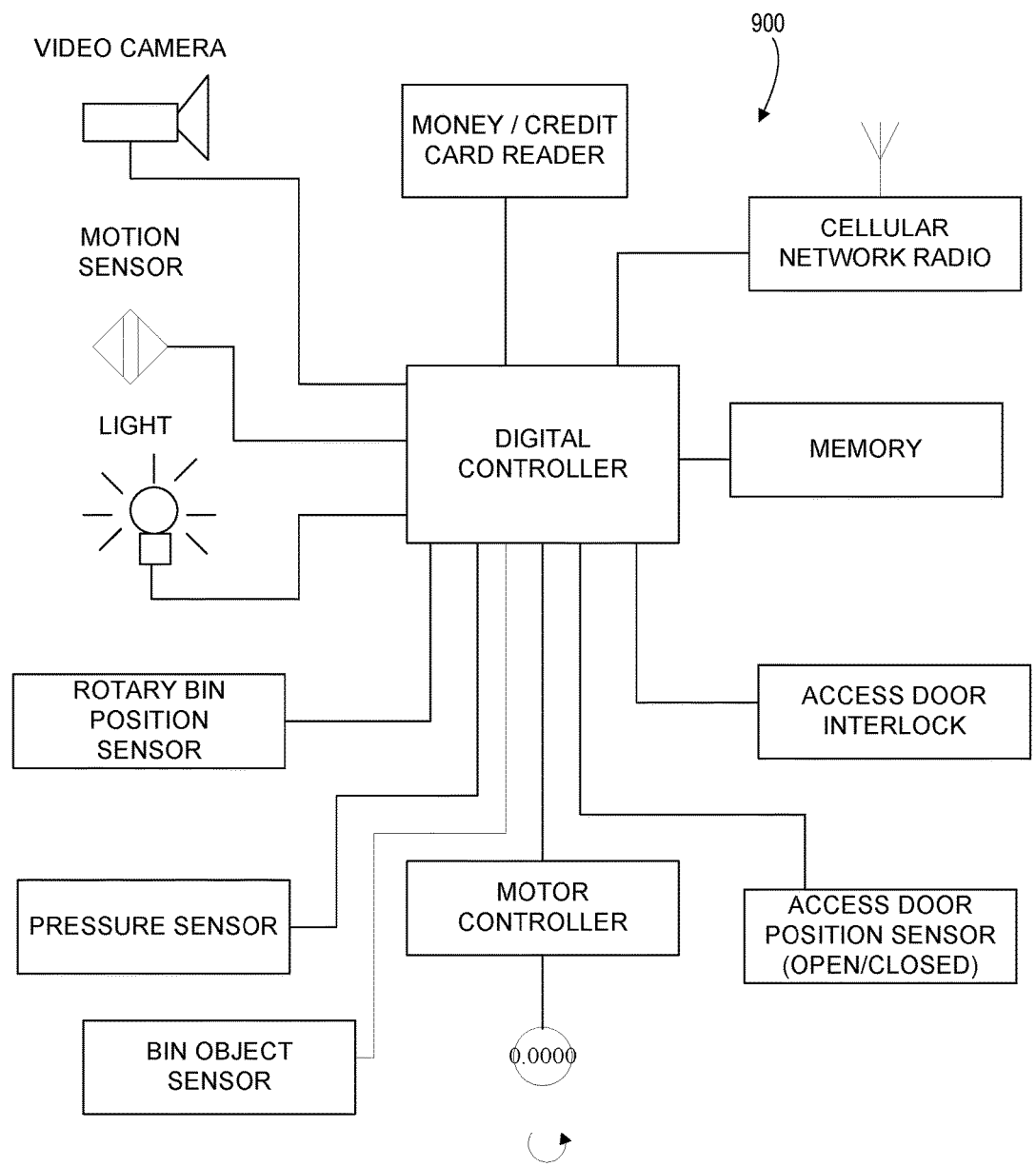
FIG. 9 is a schematic diagram of the sensors, motor controller, and controller of the receptacle of FIG. 1.

FIG. 9 is a schematic diagram showing the components of a controller 900 used in the disclosed embodiment of a pay-per-use receptacle as disclosed here. The controller 900 is a computer-controlled electronic controller that receives signals from various sensors and other electronic devices, and provides control signals for door interlock, bin rotation, etc. In one aspect, the controller receives signals from a video camera, a motion sensor, a rotary bin position sensor, a pressure or weight sensor for the bin, a bin object sensor, and an access door position sensor (open or closed). In one aspect, the controller 900 provides controls signals to illuminate a light (e.g. during darkness, and/or to signal that a person has been detected), transmit video signals for storage or off-site, control a radio (e.g. cellular radio) for credit card and payment data and security images, control the locking and unlocking of the access door, rotate the bin, determine whether a proper payment has been made, etc.

Figure 10:
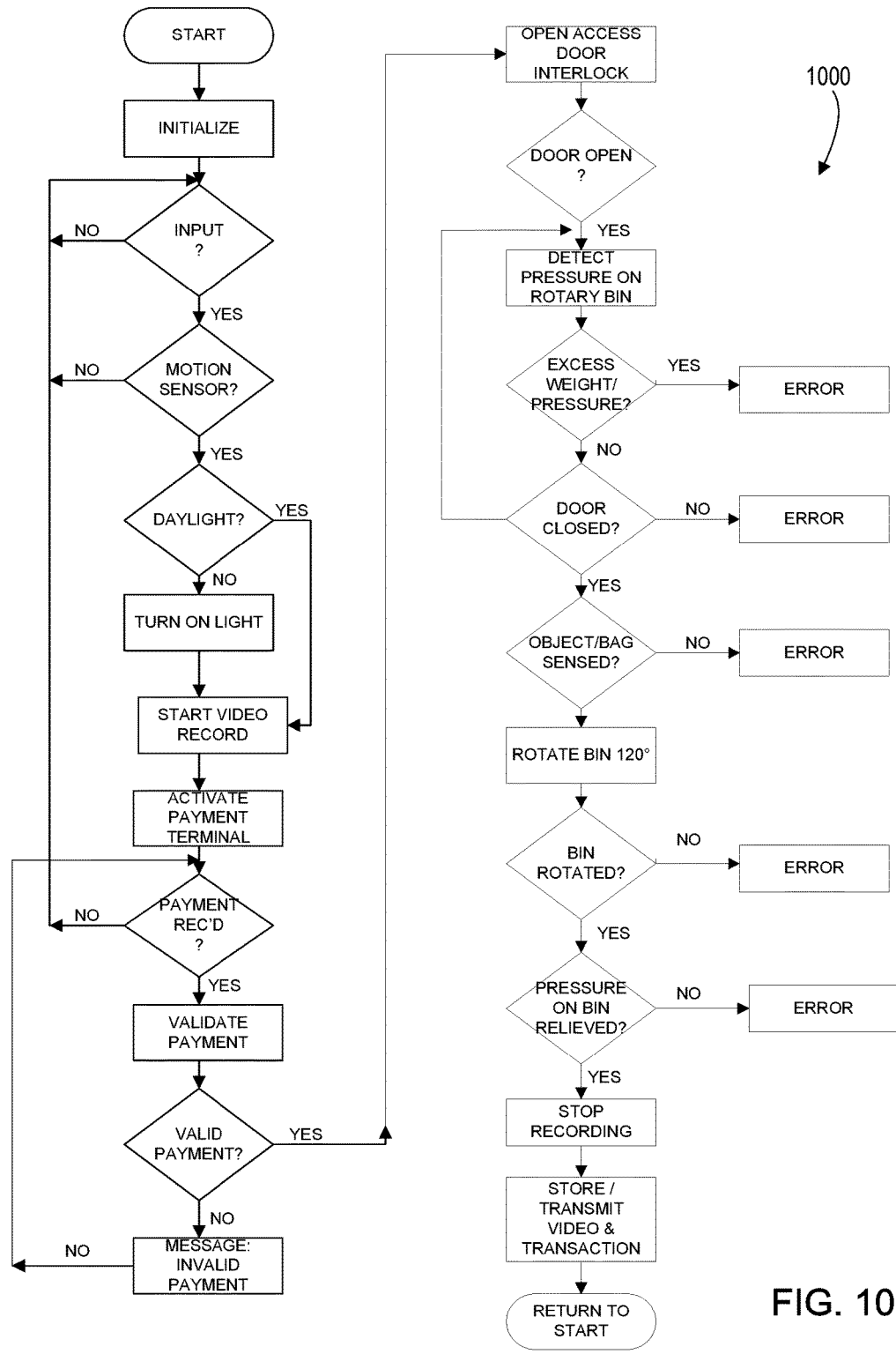
FIG. 10 is a flow chart of the operation of a controller for the receptacle of FIG. 1.

FIG. 10 is a flowchart 1000 of the operation of the controller 800, showing the computer-implemented steps of the controller to accept a payment, receive a trash bag, and move the trash bag into an external bin.

FIGS. 11-15 show our new ornamental design for a pay-per-use receptacle, according to one aspect of this disclosure. The broken lines in these figures are for environmental purposes only and form no part of the claimed design. We claim the ornamental design of a pay-per-use receptacle, as shown and described in these figures.

Figure 11:
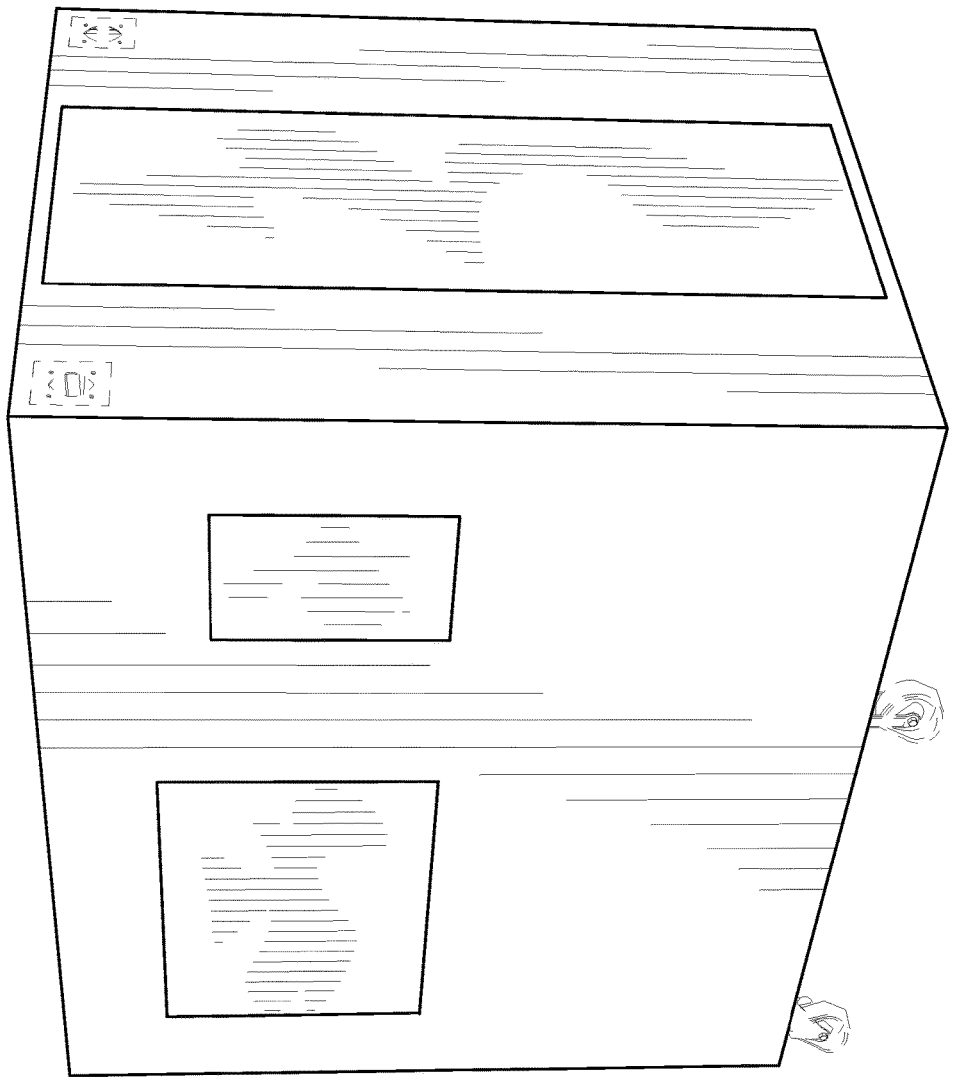
FIG. 11 is a perspective view of a pay-per-use receptacle, showing our new design.

FIG. 11 is a perspective view of a pay-per-use receptacle, showing our new design.

Figure 12:
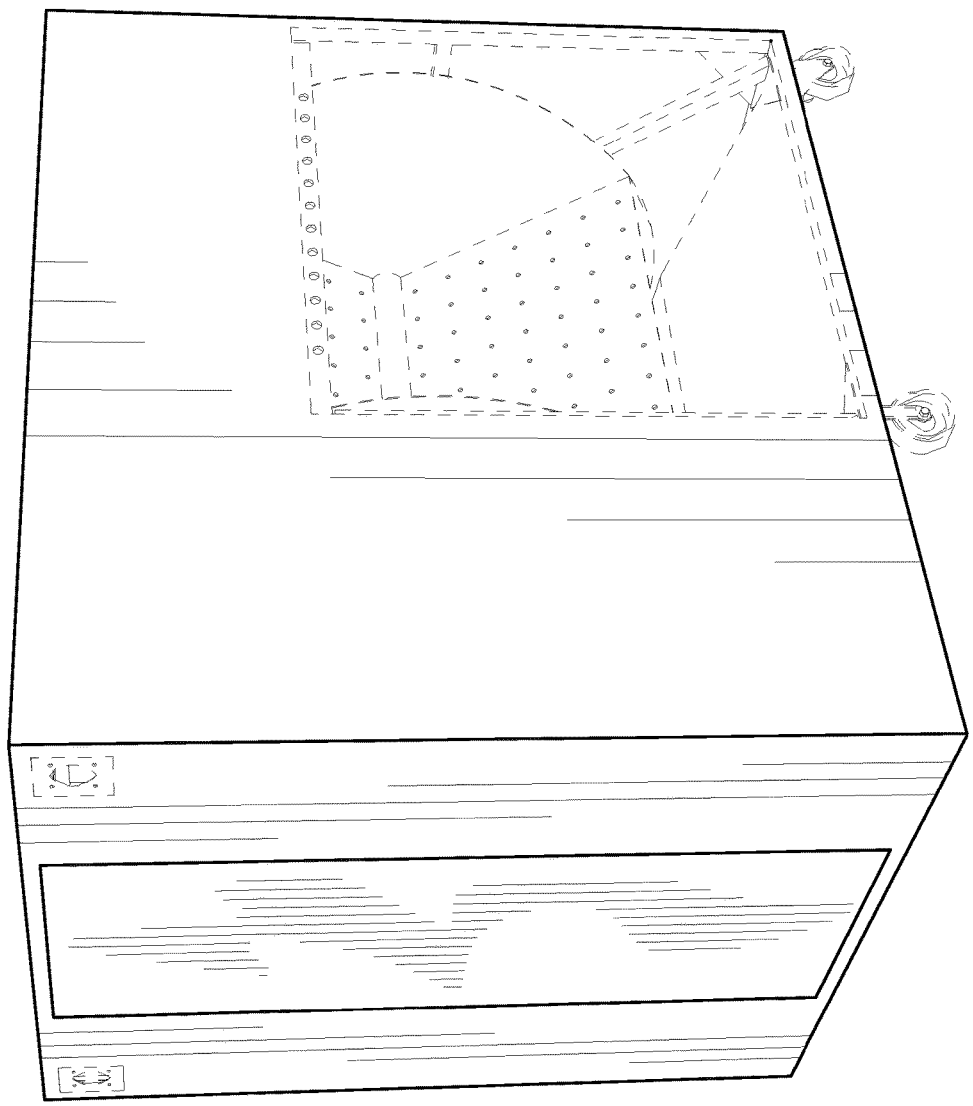
FIG. 12 is a rear perspective view thereof.

FIG. 12 is a rear perspective view thereof.

Figure 13:
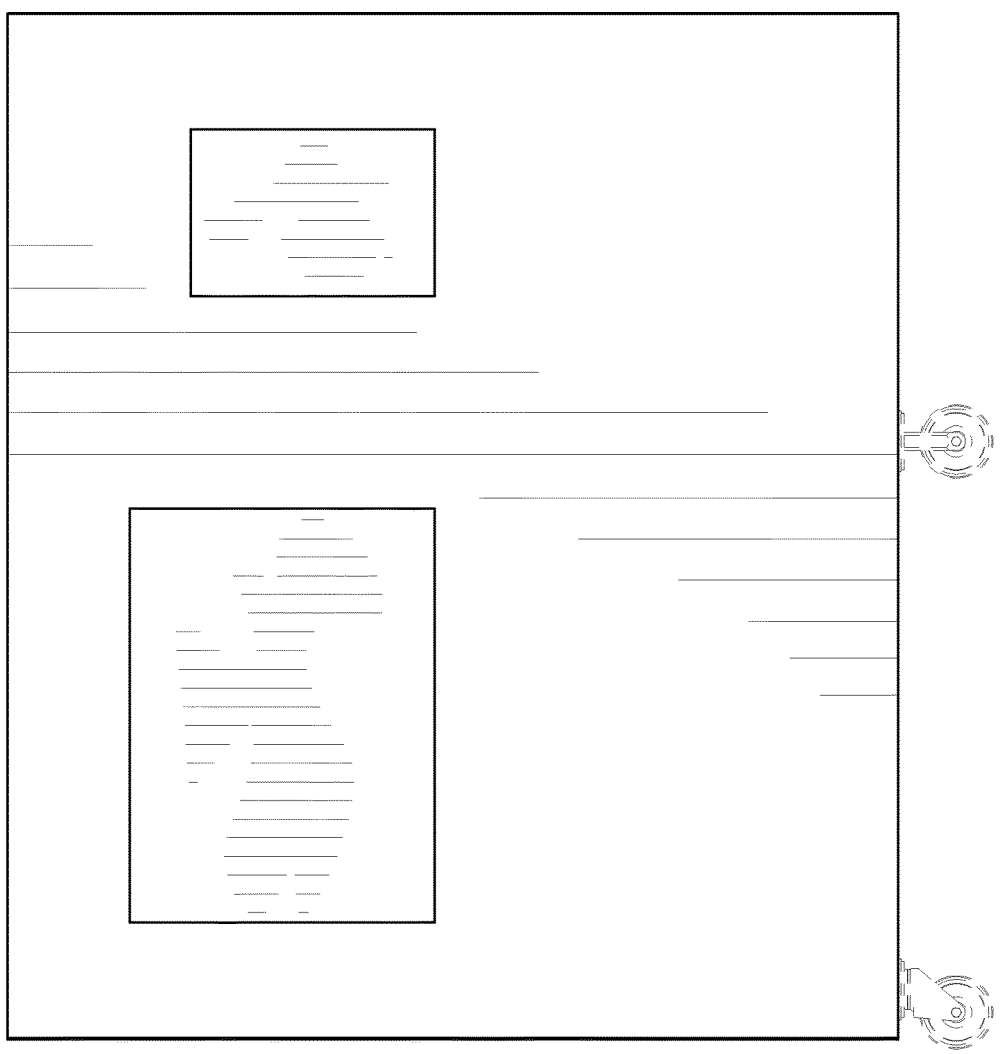
FIG. 13 is a front view thereof.

FIG. 13 is a front view thereof (with the access door open).

Figure 14:
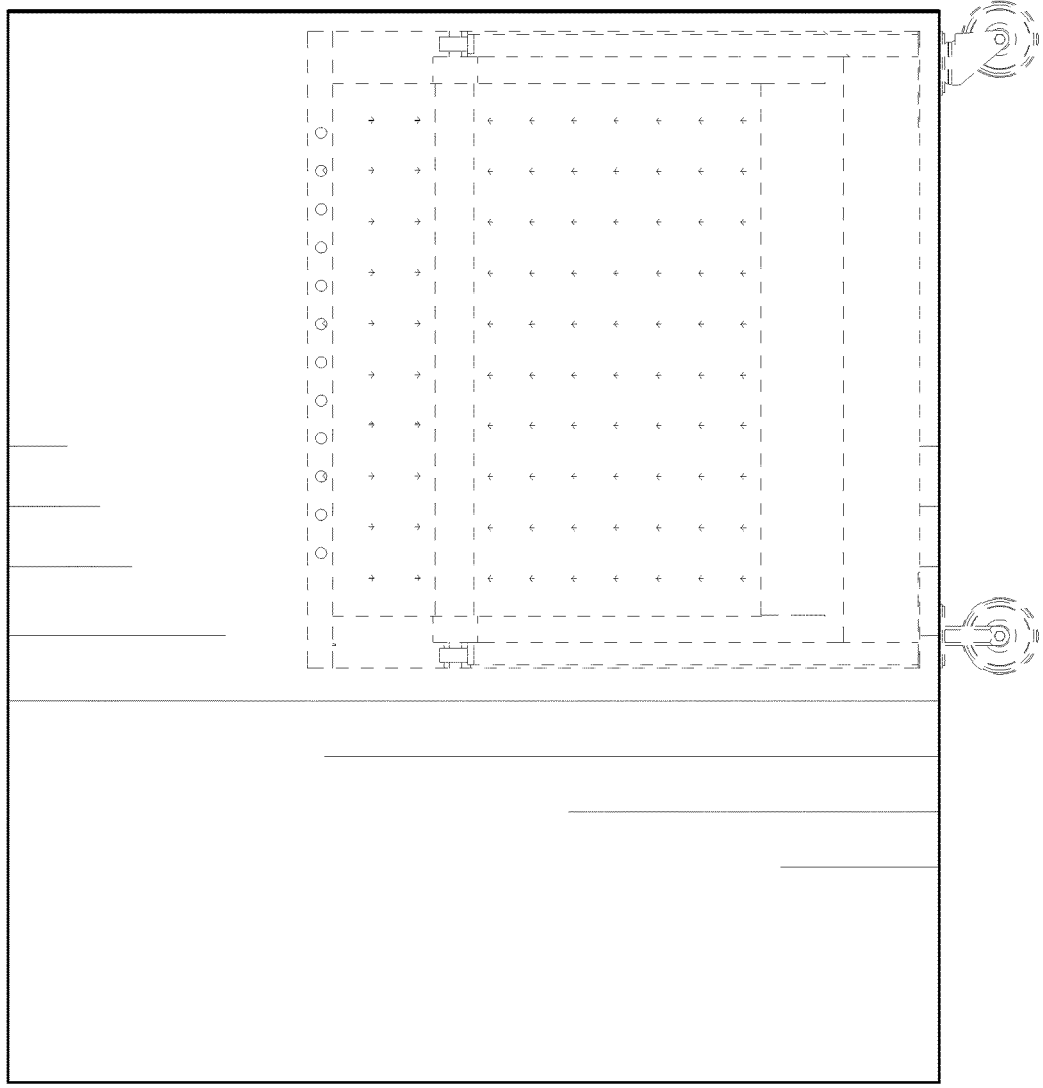
FIG. 14 is a rear view thereof.

FIG. 14 is a rear view thereof.

Figure 15:
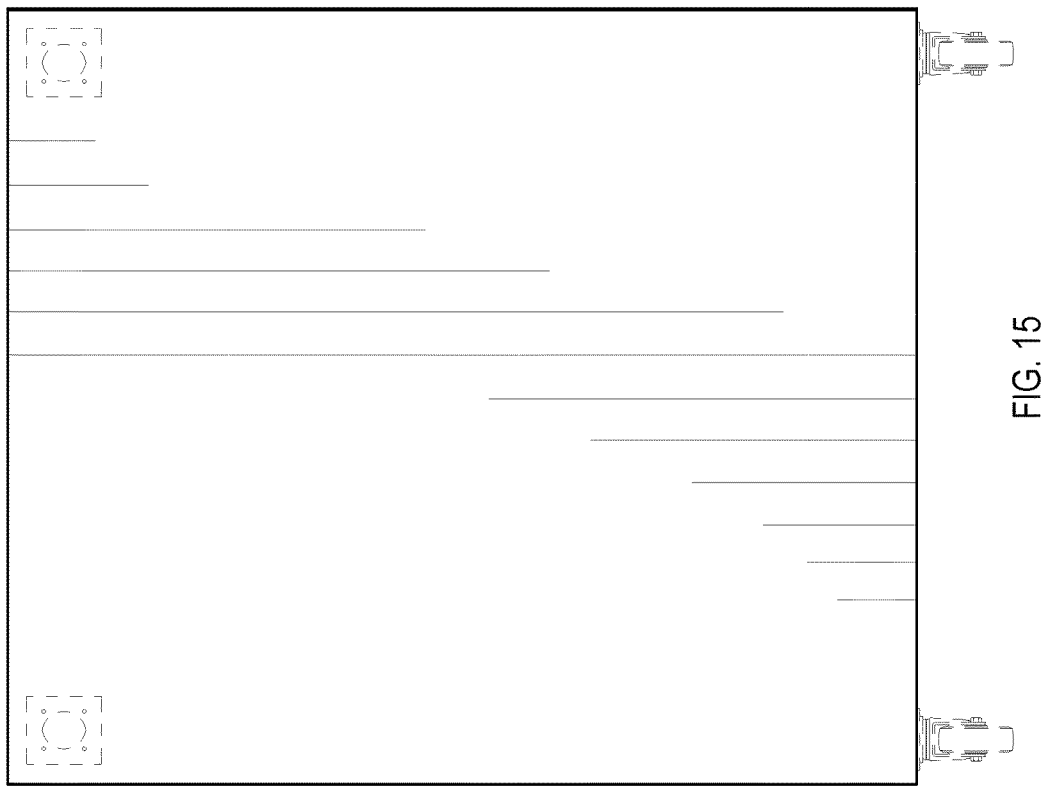
FIG. 15 is a left side view thereof.

FIG. 15 is a left side view thereof.

Figure 16:
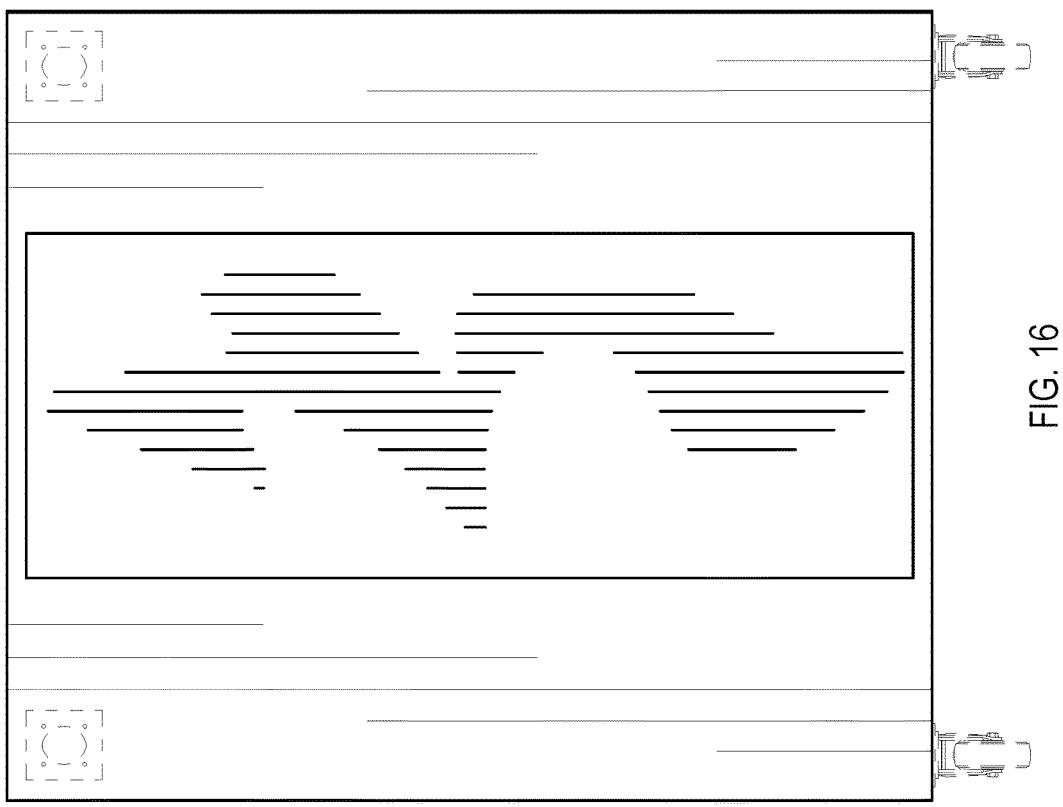
FIG. 16 is a right side view thereof.

FIG. 16 is a right side view thereof.

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A pay-per-use receptacle for use in receiving a payment for deposit of a bag of material and directing the bag of material into an external bin or other external container, comprising:
   a front surface for engaging a person for receiving a payment and a deposited bag of material, the front surface comprising a control panel with a payment-receiving terminal and an access door to the interior of the receptacle;
   an access door interlock controlled by a controller for keeping the access door locked until a valid payment is received;
   a rotatable bin mounted for rotation within the receptacle, the rotatable bin divided into a plurality of segments, each segment defined by a circular plate on each end and a generally rectangular divider plate, confined within the receptacle;
   a rear surface including a rear discharge opening for directing a deposited bag of material externally of the receptacle, the discharge opening being of a size substantially the same as a segment on the rotatable bin;
   a motor for rotating the rotatable bin a predetermined angular amount to move a bag of material deposited through the access door onto a divider plate to a position for discharge from the receptacle; and
   a controller for controlling locking and unlocking of the access door and the rotatable bin motor, the controller operative to receive and validate a payment, release the access door interlock upon receipt of a valid payment, detect the closing of the access door after deposit of a bag of material, lock the access door via the access door interlock, and rotate the rotatable bin a predetermined angular amount so as to transfer a deposited bag of material to a position such that the deposited bag is urged downwardly and outwardly of the receptacle into an external bin or other external container positioned outside the rear surface of the receptacle.

2. The pay-per-use receptacle of claim 1, wherein the access door opens into one of the segments of the rotatable bin.

3. The pay-per-use receptacle of claim 2, wherein a first divider plate of the rotatable bin is positioned substantially horizontally beneath a lowermost extent of the access door, and a second divider plate of the rotatable bin is positioned above an uppermost extent of the access door, thereby defining a segment of the rotatable bin.

4. The pay-per-use receptacle of claim 1, wherein the rotatable bin assumes an initial position such that one of the divider plates is in a generally horizontal position adjacent to the access door for receiving a bag of material when the access door is opened.

5. The pay-per-use receptacle of claim 1, further comprising a weight sensor coupled to the axis of the rotatable bin, for detecting the weight of a bag of material deposited through the access door, prior to accepting the bag of material and locking the access door.

6. The pay-per-use receptacle of claim 5, wherein the weight sensor and controller are configured to determine whether the weight of a deposited bag of material is less than a predetermined acceptable weight.

7. The pay-per-use receptacle of claim 1, further comprising a rotation position sensor coupled to the rotatable bin for detecting the instantaneous position of the rotatable bin.

8. The pay-per-use receptacle of claim 1, further comprising a motion sensor for detecting the approach of a person or thing to the front surface of the receptacle, and operative for actuating features of the controller.

9. The pay-per-use receptacle of claim 1, further comprising a camera associated with the receptacle for video recording a person's interaction with the receptacle.

10. The pay-per-use receptacle of claim 1, further comprising a light associated with the receptacle for illuminating the area surrounding the receptacle upon detection of darkness.

11. The pay-per-use receptacle of claim 1, further comprising a spring-biased, pivotable false ceiling mounted below the inner surface of the top of the receptacle to limit the volume of a segment of the rotatable bin while easing the passage of a bag of material within the segment and discharge of the bag during rotation of the bin.

* * * * *